United States Patent [19]

Kane et al.

[11] Patent Number: 5,065,545
[45] Date of Patent: Nov. 19, 1991

[54] PANEL ASSEMBLY FOR VEHICLES WITH MOLDED REGULATOR ATTACHMENT

[75] Inventors: Edmund J. Kane, Holland; Roger L. Koops, Hamilton, both of Mich.

[73] Assignee: Donnelly Corporation, Holland, Mich.

[21] Appl. No.: 671,373

[22] Filed: Mar. 19, 1991

[51] Int. Cl.$^5$ .............................................. E05F 11/38
[52] U.S. Cl. ....................................... 49/375; 49/351
[58] Field of Search ................ 49/375, 374, 351, 350, 49/363

[56] References Cited

U.S. PATENT DOCUMENTS

| | | |
|---|---|---|
| 2,296,811 | 9/1942 | Devereaux . |
| 2,379,924 | 7/1945 | Roethel ................................ 49/375 |
| 2,381,365 | 8/1945 | Parsons . |
| 2,676,042 | 4/1954 | Roethel . |
| 2,772,901 | 12/1956 | Roe . |
| 2,850,333 | 9/1958 | Hamman . |
| 3,061,363 | 10/1962 | Martinez . |
| 3,228,677 | 1/1966 | Martens . |
| 3,263,014 | 7/1966 | Deisenroth . |
| 3,381,340 | 5/1968 | Chapin, Jr. . |
| 3,516,884 | 6/1970 | Heeter et al. . |
| 3,872,198 | 3/1975 | Britton . |
| 3,919,022 | 11/1975 | Stefanik . |
| 4,119,341 | 10/1978 | Cook . |
| 4,120,120 | 10/1978 | Becker . |
| 4,139,234 | 2/1979 | Morgan . |
| 4,353,185 | 10/1982 | Saigne . |
| 4,442,633 | 4/1984 | Gianiotti . |
| 4,457,109 | 7/1984 | Royse . |
| 4,561,211 | 12/1985 | Raley et al. . |
| 4,561,625 | 12/1985 | Weaver . |
| 4,571,278 | 2/1986 | Kunert . |
| 4,584,155 | 4/1986 | Zanella . |
| 4,591,203 | 5/1986 | Furman . |
| 4,626,185 | 12/1986 | Monnet . |
| 4,648,832 | 3/1987 | Reilly et al. . |
| 4,662,113 | 5/1987 | Weaver . |
| 4,688,752 | 8/1987 | Barteck et al. . |

(List continued on next page.)

FOREIGN PATENT DOCUMENTS

| | | |
|---|---|---|
| 3545856 | 1/1987 | Fed. Rep. of Germany . |
| 2575976 | 7/1986 | France . |
| 58-417 | 1/1983 | Japan . |
| 59-199228 | 11/1984 | Japan . |
| 61-186619 | 8/1986 | Japan . |
| WO87/04126 | 7/1987 | PCT Int'l Appl. . |
| 500768 | 2/1939 | United Kingdom . |
| 1080271 | 8/1967 | United Kingdom . |
| 1410680 | 10/1975 | United Kingdom . |
| 2192658A | 1/1988 | United Kingdom . |

OTHER PUBLICATIONS

U.S. Pat. Application Ser. No. 07/554,013, filed 7/16/90, entitled Panel and Bracket Assembly and Method for Making Same, invented by Edmund J. Kane and Robert S. Herrmann, assigned to the same assignee as the present invention.

Primary Examiner—Philip C. Kannan
Attorney, Agent, or Firm—Price, Heneveld, Cooper, DeWitt & Litton

[57] ABSTRACT

A panel/window assembly for vehicles adapted to be raised and lowered by a window regulator mechanism. The assembly includes at least one regulator mechanism attachment member molded directly on one peripheral edge of a preferably transparent sheet from a resinous material, preferably reaction injection molded polyurethane. The attachment member may include either a generally C-shaped channel having an elongated slot opening to one side for receiving a roller from the regulator mechanism, or an elongated opening extending entirely through the attachment member to receive the roller from either side of the assembly. Alternately, a pair of the attachment members may be positioned along the sheet edge and molded integrally with gasket portions on other portions of the sheet edge to provide guides for raising and lowering the window.

53 Claims, 4 Drawing Sheets

U.S. PATENT DOCUMENTS

| | | |
|---|---|---|
| 4,694,610 | 9/1987 | Hornivius . |
| 4,695,420 | 9/1987 | Grawey et al. . |
| 4,712,287 | 12/1987 | Johnston . |
| 4,723,809 | 2/1988 | Kida et al. . |
| 4,755,339 | 7/1988 | Reilly et al. . |
| 4,761,916 | 8/1988 | Sanok et al. . |
| 4,762,481 | 8/1988 | Weaver . |
| 4,765,672 | 8/1988 | Weaver . |
| 4,776,132 | 10/1988 | Gold . |
| 4,778,366 | 10/1988 | Weaver . |
| 4,792,425 | 12/1988 | Weaver . |
| 4,795,667 | 1/1989 | Armstrong . |
| 4,805,346 | 2/1989 | Gergoe . |
| 4,823,511 | 4/1989 | Herliczek et al. . |
| 4,826,417 | 5/1989 | Reilly et al. . |
| 4,830,804 | 5/1989 | Weaver . |
| 4,834,931 | 5/1990 | Weaver . |
| 4,839,122 | 6/1989 | Weaver . |
| 4,854,636 | 8/1989 | Greenhalgh et al. . |
| 4,894,972 | 1/1990 | Endoh et al. . |
| 4,915,395 | 4/1990 | Barteck . |
| 4,925,511 | 5/1990 | Ikeda et al. . |
| 4,943,179 | 7/1990 | Horiki et al. . |
| 4,998,379 | 3/1991 | Yamada et al. .................. 49/351 X |

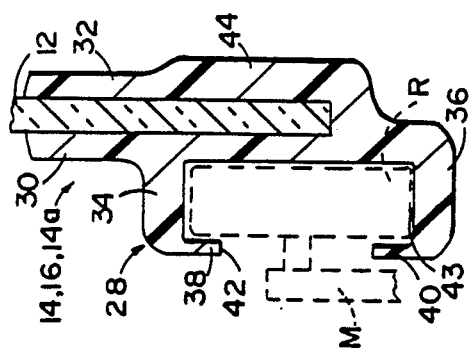
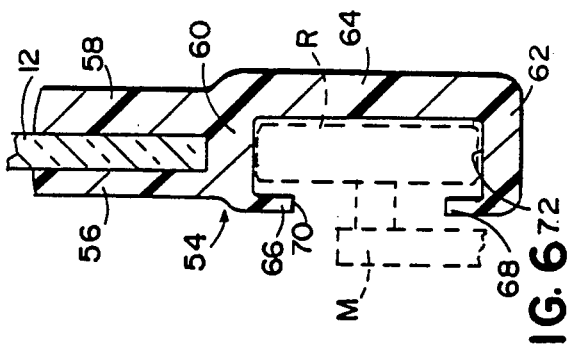
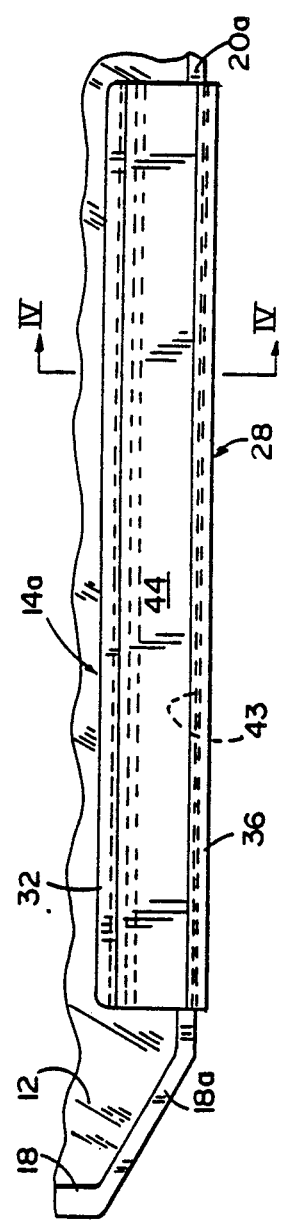
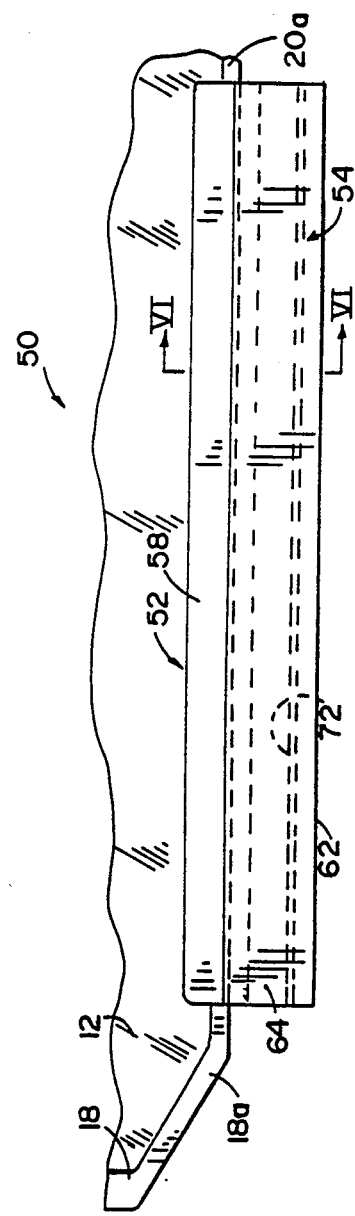

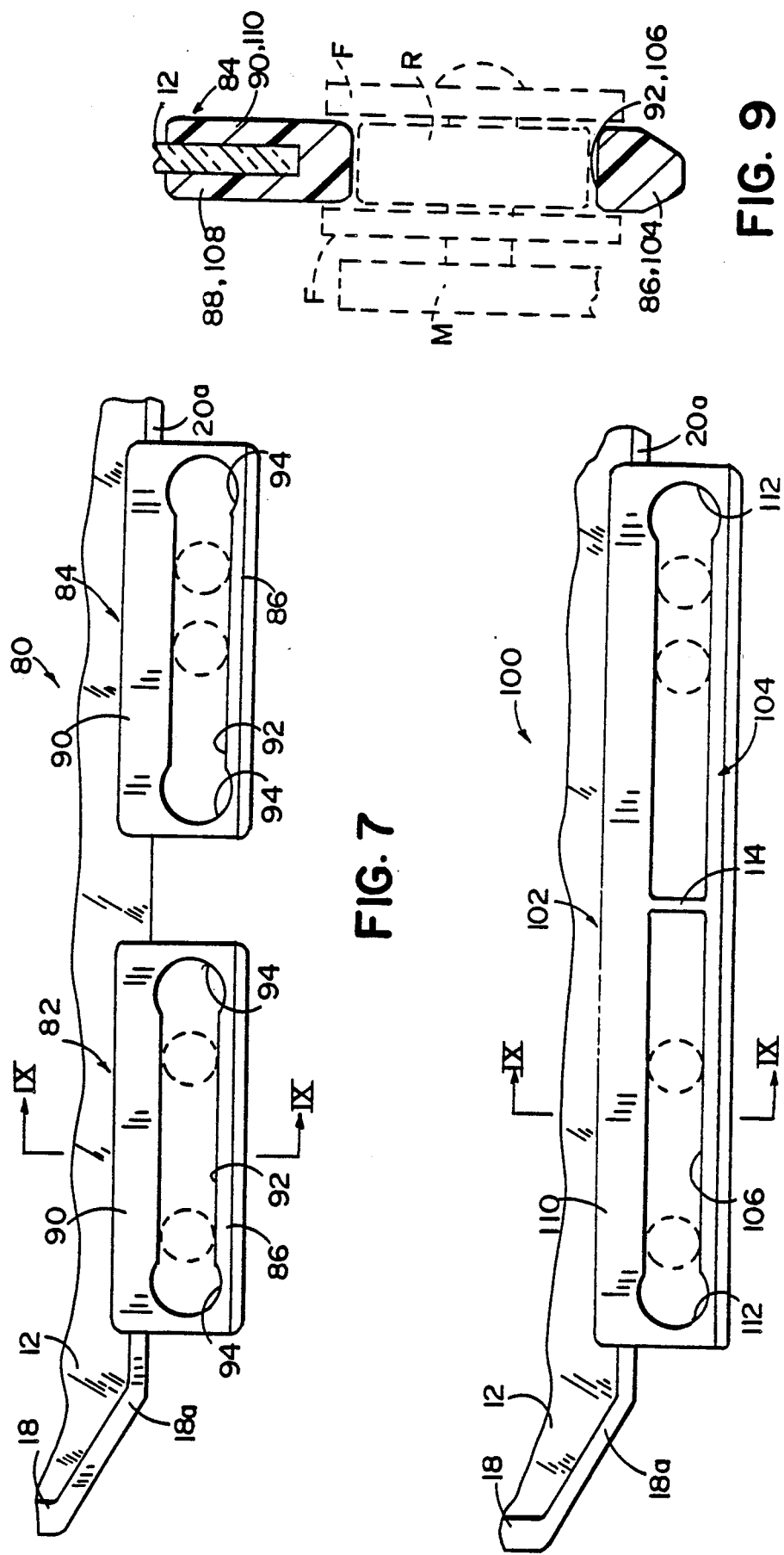

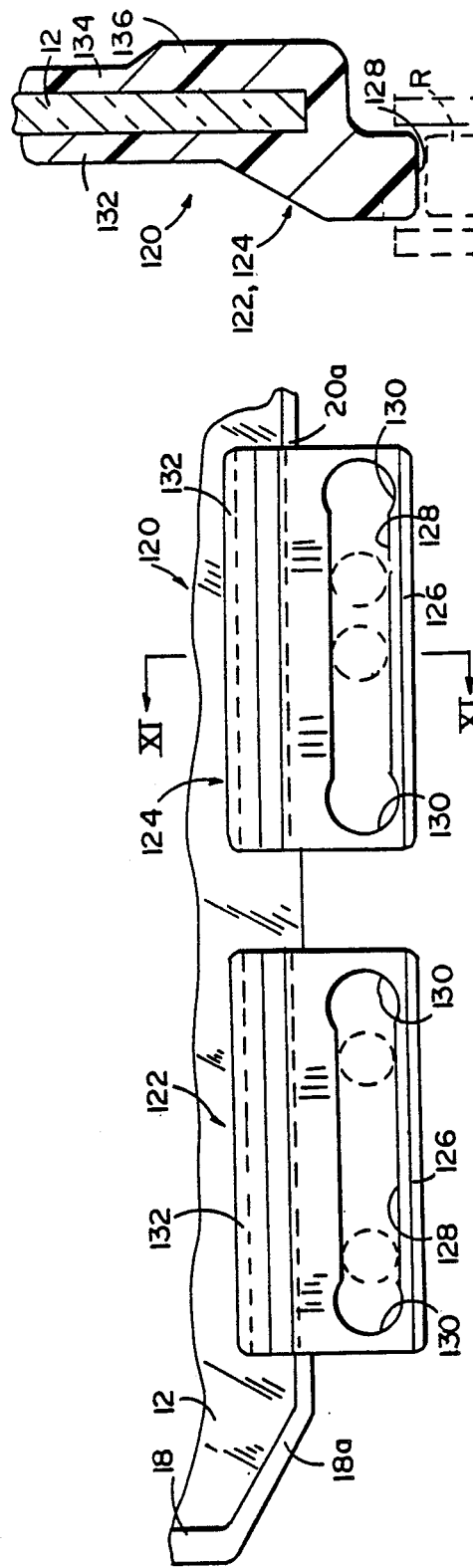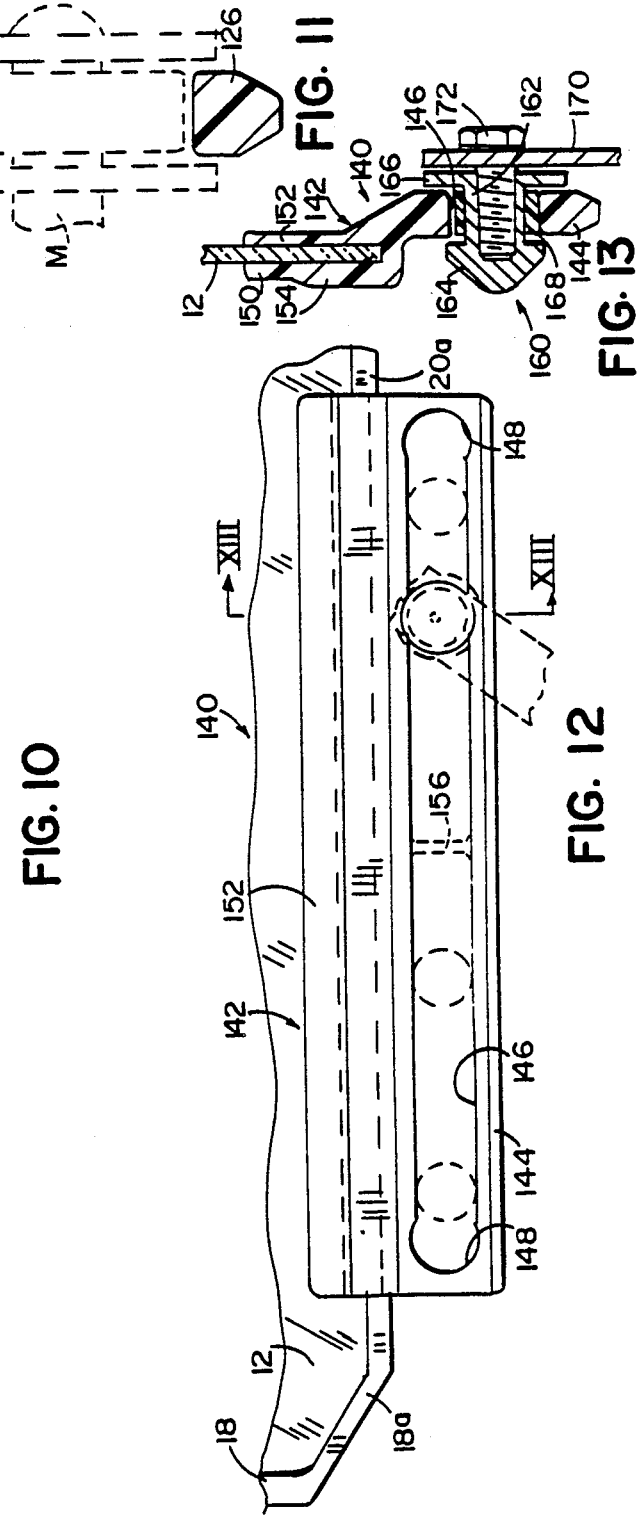

PANEL ASSEMBLY FOR VEHICLES WITH MOLDED REGULATOR ATTACHMENT

FIELD OF THE INVENTION

This invention relates to panel assemblies especially adapted for use as windows in vehicles or other structures where the window must be raised or lowered usually by sliding movement by means of a window regulator mechanism connected to the window assembly. More particularly, the invention is a window panel assembly providing one or more attachment members which are molded directly in place on a sheet of material for receiving a roller from a window regulator mechanism.

BACKGROUND OF THE INVENTION

In a typical vehicle, two or more side window panels are provided adjacent the driver and passenger which may be raised and lowered usually by sliding movement via hand operated or electrical mechanisms. The window panel assemblies are mounted in tracks or channels and are generally moved vertically. It is common to provide a bracket along the bottom edge of the window which allows for the attachment of a scissors linkage, gear driven regulator mechanism, tape or cable drive system all of which are generally known as window regulator mechanisms to move the window when desired. The prior know brackets have normally been rigidly attached to the sheet glass forming the window in various ways to provide a channel for receipt of rollers or other connections to the mechanisms.

Various drawbacks have been encountered in prior known window panel assemblies incorporating such brackets. First, metal brackets are expensive to manufacture and/or expensive to attach to the glass window panel without breakage. Generally, the metal brackets required additional labor and/or processing steps. In some cases, the metal brackets loosened after attachment of after installation in the vehicle causing malfunction of the window regulator mechanism and trapping the window either in an open or partially open position.

Secondly, the prior known metal brackets are difficult to consistently manufacture in closely fitted tolerances. Hence, the fit of the window regulator roller or other mechanism portion to the brackets varied within wide ranges. In some cases, the tolerance was sufficiently large to cause vibration or rattles between the regulator mechanism connection and the sheet creating annoyance and inconvenience to the vehicle owner.

Thirdly, the prior known metal brackets were often difficult to adapt to the position requirements of the window regulator rollers and other mechanism portions. The brackets often required sharp bends in the metal to locate the channel or other bracket portions appropriately for connection to the roller mechanisms. In addition, it was often necessary to preassemble portions of the regulator mechanism followed by further assembly steps after insertion in the bracket to enclose the rollers properly in position. Alternately, many roller assemblies had to be completely assembled within the metal brackets for proper installation.

All of the above problems added to the inconvenience and expense of providing proper mounting for window regulator mechanisms on sheet glass and other windows and panels in vehicles. The present invention was devised as a solution for these and other problems by providing a panel assembly including an attachment member molded directly on the glass or other sheet material of the sheet thereby eliminating the need for separate metal brackets and the above attendant problems.

SUMMARY OF THE INVENTION

Accordingly, the present invention provides a panel assembly especially adapted for use in vehicle windows including an attachment member molded directly on the sheet material of the assembly from a resinous material without requiring any fastening members to extend through the sheet. The panel is adapted for raising and lowering, typically by sliding movement, via one of several types of regulator mechanisms such as a scissors linkage or the like which may be conveniently assembled to the attachment member.

In one form, the invention is a panel assembly comprising a sheet of material, which may be transparent if the assembly is a window, or opaque if not, and at least one attachment member for connecting the sheet to a support such as a window regulator mechanism. The attachment member is molded directly on the peripheral edge of the sheet from a moldable, resinous material such that the member is securely adhered to the sheet during molding. The attachment member has securing flanges extending along both side surfaces of the sheet which encapsulate the peripheral sheet edge and an elongated slot extending along the length of the member for receiving a portion of the window regulator mechanism. Access means are included for inserting a portion of the window regulator mechanism in the slot. The assembly allows a portion of the regulator mechanism to be supported on the attachment member for movement in the slot to move the panel assembly between desired positions.

In a preferred form of the invention, the attachment member may include an elongated, generally C-shaped channel portion with the slot comprising an elongated opening in one side of the channel. The opening communicates to the channel portion interior for receiving a part of the window regulator mechanism. In one form, the channel portion overlaps the peripheral sheet edge. Alternately, the C-shaped channel portion may be aligned with the peripheral edge of the sheet.

In another form of the invention, the attachment member may include an attachment flange extending outwardly of the peripheral sheet edge and a slot comprising an elongated opening having closed ends and extending entirely through the attachment flange enabling access thereto from either side of the assembly. Such opening is adapted to receive a portion of the window regulator mechanism. At least one of the closed ends of the elongated opening preferably includes an enlarged area adapted to receive a roller from the regulator mechanism prior to insertion into the elongated opening. In addition, depending on the length of the attachment member, a molded support may be included across the opening for additional strength.

In either form of the invention, molded securing flanges extend toward the center of the sheet on the attachment member, at least one of which may include an area of increased thickness as compared to the remainder of either securing flange to enhance adherence of the molded attachment member to the sheet glass. In addition, with either form of the attachment member, a spaced pair of attachment members may be formed on one edge, typically the lower edge, of the panel in order to reduce material requirements based on the known paths of travel of the regulator mechanisms.

In yet other aspects of the invention, the attachment member or members may be molded integrally with gasket portions on other sheet edge portions of the assembly to provide guides for raising and lowering the window.

Preferably, the attachment members are formed on the sheet by molding with a resinous, polymeric molding material such as reaction injection molded polyurethane, the attachment members being adhered and bonded to the sheet by forming and curing within a mold apparatus.

As will be understood from the invention, numerous advantages over prior known panel/window assemblies are provided by this invention. These include cost savings and manufacturing simplification by the elimination of prior known metal brackets due to the complete formation of necessary window regulator attachment members by molding. The molded attachment members provide significantly better manufacturing consistency and tolerance for fitting with rollers and other portions of the regulator mechanisms. The closer tolerance provided by the molded attachment members eliminates vibration and rattles encountered in prior known assemblies, the molded attachment members also enable easier attachment and installation of the regulator mechanisms, and provide a greater ability to properly position the attachment members for connection to the regulator mechanism in the vehicle itself. Further, the molded attachment members eliminate the need for multiple, performed, separate elements which must be joined together. Moreover, the molded attachment members are durable and noncorrosive and well adapted for use in the often harsh environments encountered during vehicular use in varying climates.

These and other objects, advantages, purposes and features of the invention will become more apparent from a study of the following description taken in conjunction with the drawings.

BRIEF DESCRIPTION OF THE DRAWINGS

FIG. 3 is an enlarged, fragmentary, plan view of the bottom portion of a second embodiment of the window panel assembly present invention;

FIG. 4 is a sectional view of the window panel assemblies of FIGS. 2 and 3 taken along plane IV—IV in each figure, and also illustrating a roller from a scissors-type window regulator mechanism;

FIG. 5 is an enlarged, fragmentary, plan view of the bottom portion of a third embodiment of the window panel of the present invention;

FIG. 6 is a sectional view of the window panel assembly taken along plane VI—VI of FIG. 5 and also illustrating a roller from a scissors-type window regulator mechanism;

FIG. 7 is an enlarged, fragmentary, plan view of the bottom portion of a fourth embodiment of the window panel assembly of the present invention;

FIG. 8 is an enlarged, fragmentary, plan view of the bottom portion of a fifth embodiment of the window panel assembly of the present invention;

FIG. 9 is a sectional view of the window panel assemblies of FIGS. 7 and 8 taken along plane IX—IX in each figure;

FIG. 10 is an enlarged, fragmentary, plan view of the bottom portion of a sixth embodiment of the window panel assembly of the present invention;

FIG. 11 is a sectional view of the window panel assembly of FIG. 10 taken along plane XI—XI:

FIG. 12 is an enlarged, fragmentary, plan view of the bottom portion of a seventh embodiment of the window panel assembly of the present invention; and FIG. 13 is a sectional view of the window panel assembly of FIG. 12 taken along plane XIII—XIII.

DESCRIPTION OF THE PREFERRED EMBODIMENTS

Figure 1:
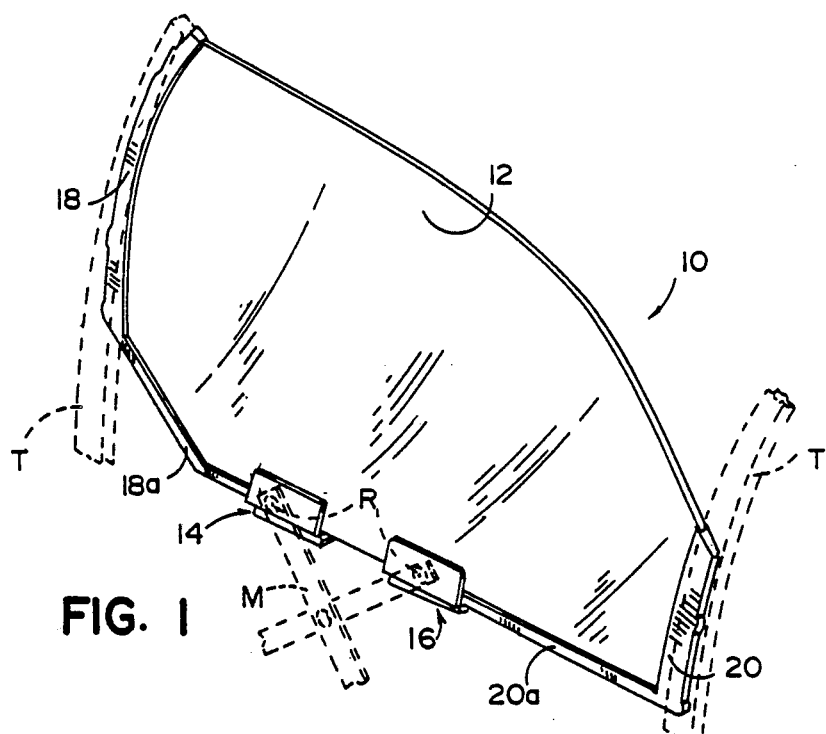
FIG. 1 is a perspective view of a window panel assembly of the present invention incorporating a pair of molded attachment members adapted to receive a scissors-type regulator mechanism for raising and lowering the window and also illustrating the tracks for guiding the sliding movement of the window panel assembly.
Figure 2:
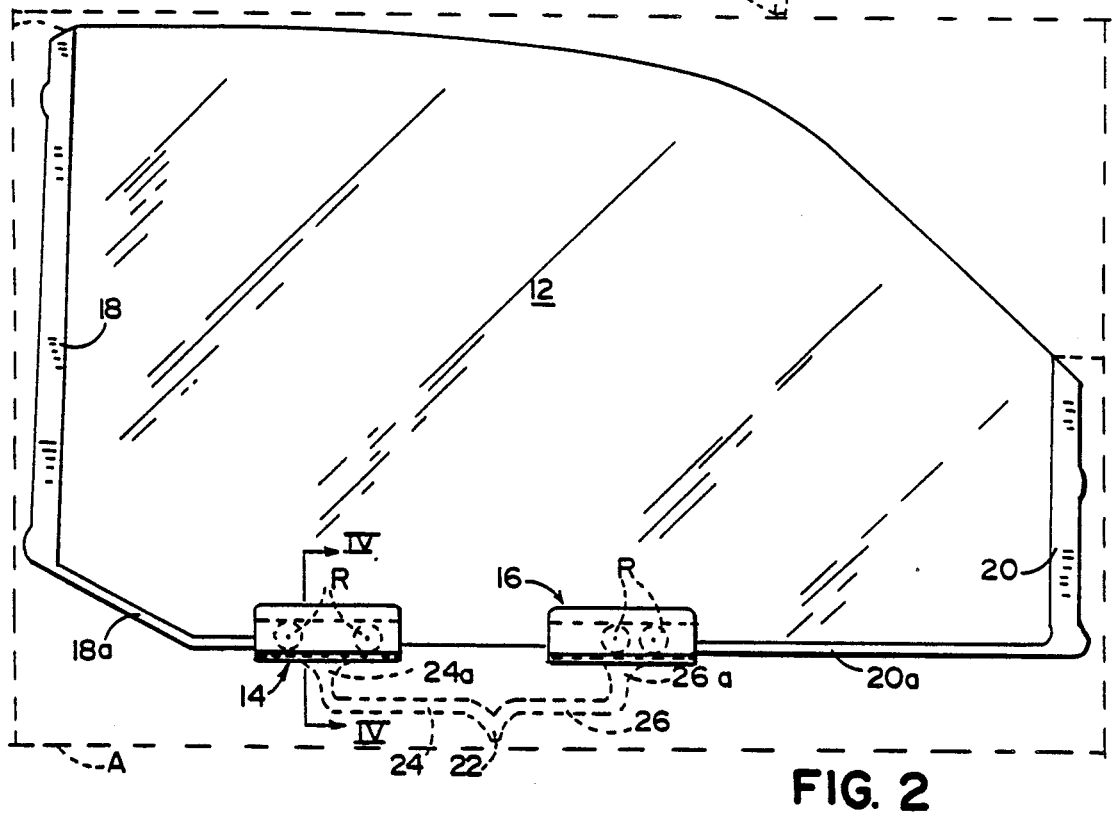
FIG. 2 is a plan view of the window panel assembly shown in FIG. 1 and also illustrating a portion of a suitable mold apparatus used to form the attachment members and gasket portions on the transparent sheet material to form the assembly.

Referring now to the drawings in greater detail, FIGS. 1 and 2 illustrate a first embodiment 10 of the window panel assembly of the present invention. Assembly 10 is specifically adapted for use as a vehicle window and includes a configured, preferably curved sheet 12 of transparent glass which may be tempered, laminated or otherwise strengthened with conventional principles and also includes two spaced attachment members 14, 16 and a pair of spaced, peripheral edge gasket or casing portions 18, 20. Preferably, attachment members 14, 16 and gasket or casing portions 18, 20 are all simultaneously formed directly on the sheet glass 12 in a molding apparatus into which sheet 12 is inserted from a resinous plastic or polymeric molding material, preferably reaction injection molded polyurethane, or polyvinyl chloride, of sufficient strength, rigidity and hardness to withstand operation of the window and regulator mechanism. Attachment members 14, 16 are adapted to receive therein the rollers from a scissors-type window regulator or raising and lowering mechanism M shown in phantom in FIG. 1. Spaced gasket portions 18, 20 may also be formed on other peripheral edge portions such as the vertical rear edge of the window and the vertical forward edge of the window. Rear and front edge gasket portions 18, 20 are adapted to be received in tracks or channels T shown in phantom in FIG. 1, which tracks are usually fitted in the doors of a vehicle to guide the substantially vertical movement of the window assembly.

With reference to FIGS. 2 and 3, the lower half of a suitable mold apparatus A is shown in phantom including representative runners or channels 22, 24, 26 through which mold materials such a polymeric reaction injection molded (RIM) polyurethane components, which have been previously mixed together with an aftermixer device, or polyvinyl chloride materials, are injected into suitable mold cavities to form attachment members 14, 16 as well as gasket or casing portions 18, 20 on the transparent sheet 12 which is simultaneously held within the mold half. The channels or runners include a main runner 22 leading to a bifurcated channel 24, 26 having fan shaped exit portions 24a, 26a adapted to introduce molding material into a first cavity which forms gasket portion 18 and connecting portion 18a, as well as a second cavity for gasket portion 20 and connecting portion 20a. Connecting portions 18a, 20a extend from opposite ends of attachment members 14, 16. The cavity which forms attachment member 14 acts as a connection chamber leading to the smaller cavity forming connection portion 18a which is adhered to the lower edge of sheet 12 and which, in turn, leads to the cavity forming gasket portion 18. Likewise, the cavity which forms attachment member 16 acts as a connection chamber leading to the smaller cavity forming connection position 20a which extends along another portion of the lower edge of sheet 12 and, in turn, leads to the cavity forming gasket portion 20. In the preferred embodiment, attachment members 14, 16 are not joined by any molded portion or the like. However, a variant of the window assembly could be formed by using either runner 24 or 26 alone and having a connection portion intermediate the attachment members 14, 16 such that only a single exit portion or runner could be used to fill the entire cavity along the entire length of the sheet edge to be encapsulated.

Prior to injecting polymeric material through runners 22, 24 and 26, a sheet 12 of transparent material, preferably glass, is placed within the recess in mold half A such that the edges of the sheet project into the mold cavities adapted to form the attachment members 14, 16, connecting portions 18a, 20a, and gaskets 18 and 20. Prior to such insertion, sheet 12 is preferably coated on the edges which will receive the attachment members, connecting portions and gaskets with a suitable conventionally known primer coating which enhances the adherence or bond between the polymeric material and the glass surfaces during molding. Thereafter, the desired polymeric material is injected through the runners or channels 22, 24 and 26 such that the mold cavities are filled. As will be understood from FIG. 4, attachment members 14, 16 include a section which envelopes and encapsulates the edge of the glass sheet 12. After the polymeric material cures and/or sets up within the mold, the formed window panel assembly, including attachment members 14, 16, connecting portions 18a, 20a, and gasket portions 18, 20, is removed from the mold once the top half of the mold apparatus is withdrawn. As is conventionally known in the molding art, appropriate seals may be included in the upper and lower mold halves to close off cavities forming these molded portions within the mold to prevent the escape of molding material onto the center portions of the glass sheet 12 and from the mold apparatus overall during the molding process.

Although the use of plastic or polymeric molding materials such as reaction injection molded (RIM) polyurethane is preferred, polyvinyl chloride could alternately be used for the attachment members, connecting portions and gasket members if made sufficiently rigid to support the window regulator mechanism rollers and such that gasket portions 18, 20 which slide in guide tracks T are also sufficiently rigid. A suitable primer to be applied to the glass sheet 12 before molding of these portions from the reaction injection molded polyurethane may be obtained from Lord Corporation of Erie, Pennsylvania under the product designation Chemlock AP-134. In addition, it is possible that other polymeric and/or moldable materials may be used to form these molded portions and that other transparent sheetings such as acrylic or other plastic materials may be used instead of glass depending on the desired window application. Of course, glass coated with an opaque or translucent frit layer or other opaque or translucent sheet materials may be substituted for the transparent glass or plastic sheeting of assembly 10 to produce other panel assemblies within the scope of this invention.

Referring now to FIGS. 1, 2 and 4, each of the spaced attachment members 14, 16 includes a generally C-shaped channel portion 28 and securing flanges 30, 32 which envelope and encapsulate the edge and adjacent periphery of the glass sheet 12 at the location of the attaching member. Molded securing flanges 30, 32 extend inwardly toward the center of sheet 12 along the sheet side surfaces from the peripheral edge. Securing flange 30 forms one side wall of the channel portion 28 which overlaps the peripheral edge of the sheet 12 as shown in FIG. 4. Channel portion 28 also includes a top wall 34, bottom wall 36 and retaining flanges 38, 40 which define an elongated interior channel 43. Flanges 38, 40 are in alignment and extend toward one another to define an elongated, side opening 42 which is opposed to the closed side of channel portion 43 formed by securing flange 30. Bottom wall 36 merges into the lower portion of securing flange 32 thereby enclosing the peripheral edge of the sheet. Along one portion of securing flange 32 adjacent the periphery of the sheet is formed in elongated area 44 having an increased thickness as compared to the remainder of the securing flange 32 or the other securing flange 30. Increased thickness area 44 provides enhanced adherence of the molded material to glass sheet 12 by providing a higher curing heat for the primer thereby producing better overall adhesion strength for the mold material to the glass after molding.

As is best seen in FIG. 4, elongated channel 43 is also elongated in the height dimension. The ends of the channel portion 43 are open for access to and insertion of a suitable roller from the window regulator mechanism M as shown in FIG. 4. Although confining members may be inserted in the ends of the channel after insertion of the roller therethrough, they are not typically needed because the entire assembly 10 is confined in tracks T in the vehicle and mechanism M prevents removal of the rollers. The molded RIM polyurethane material is of sufficient strength to support roller R on bottom wall 36 without deflection in order to raise and lower window assembly 10 in a sliding movement along tracks T as shown in FIG. 1. Approximately one-half of the height of channel 43 lies inside or toward the center of sheet 12 from its peripheral edge. The remaining half projects outwardly of the peripheral edge thereby providing the overlapping position of the channel with respect to the edge. Such position helps provide additional support for the channel portion 28 by means of the rigid sheet glass 12 acting as a backup support for the channel. As is also apparent from FIGS. 1, 2 and 4, channel portion 43 in each of the attaching members is generally rectilinear as is the lower edge of sheet 12 in the preferred embodiment. Preferably, attaching members 14, 16 are molded on sheet 12 such that openings 42 and channels 43 extend generally parallel to the lower edge as shown in FIG. 2. It is within the scope of the present invention, however, to provide other than rectilinear channels depending on the motion to be provided for assembly 10. In this respect, molding a curved channel in each of the attaching members may cause the window assembly to tip or rotate in a fore and aft direction as it is being raised or lowered, or be moved at other than a constant rate within different portions of the tracks T. The molding process for attachment members 14, 16 is uniquely adapted to provide different configurations while maintaining the close tolerance necessary for precision fitting of window regulator mechanism to the window assemblies.

As shown in FIG. 2, when rollers R from opposite portions of scissors-type window regulator mechanism M (FIG. 1) are received in channels 43 of the spaced attachment members 14, 16, the bar members upon which rollers R are mounted may be pivoted by an appropriate manual or power mechanism about the center pivot to raise or lower window assembly 10. Based on the connection point and positioning of the regulator mechanism, the rollers will travel different distances along channel portions 43 during such motion. The limits of travel for the rollers in a typical scissors-type window regulator mechanism M are shown in phantom in FIG. 2. As is apparent, neither roller approaches the extreme end of attachment member 14, 16. In addition, the area between attachment members 14, 16 is not required as a track or channel portion for receipt of the rollers during normal motion. Hence, by eliminating the center section between members 14, 16, material is saved and the overall cost of the assembly is lowered.

Alternately, however, a single continuous attachment member 14A may be used in the assembly as is shown in FIG. 3 where like numerals indicate like parts to those in attachment members 14, 16. In member 14A, which has the same shape in section as members 14, 16, the same top, bottom and side walls are provided adjacent the periphery of sheet 12 but in a longer, more extended length. Likewise, securing flanges 30, 32 are included along with increased thickness area 44 to provide enhanced adherence. In this form, only a single channel or runner 24 or 26 is required to fill the cavity in the mold forming member 14A, which cavity in turn leads to the connecting portions 18A, 20A and to gaskets 18, 20 respectively As with each of the attaching members 14, 16, the ends of channel portion 43 are open allowing insertion of rollers R. As above, channel 43 overlaps the peripheral edge of sheet 12. The center section of attaching member A (not present in assembly 10 which uses separate attaching members 14, 16) also helps to increase the adhering strength of the channel portion to the glass to ensure retention of the window regulator mechanism to the window glass throughout the life of the vehicle in which it is installed.

With reference to FIGS. 5 and 6, a third embodiment 50 of the window panel assembly is shown including a single, elongated attaching member 52 molded directly on the lower edge of a sheet 12 of transparent glass as in embodiments 10 and 14A. In embodiment 50, attaching member 52 includes a channel portion 54 and a pair of securing flanges 56, 58 which envelope and encapsulate the periphery and edge of a lower portion of sheet 12 as shown in FIG. 6. Instead of channel portion 54 overlapping a portion of the side surface of sheet 12 as in attaching members 14, 16 and 14A, channel portion 54 is generally aligned with the edge of sheet 12 in the general plane of the sheet material. As above, channel portion 54 includes top wall 60, bottom wall 62, closed side wall 64 and retaining flanges 66, 68 which extend toward one another to define opening 70 leading to interior channel 72 defined by the top, bottom and side walls As with channel portion 28 and attaching members 14, 16 and 14A, the ends of channel portion 54 are open to allow insertion of roller R which, again, is vertically elongated as well as being elongated in the lengthwise direction and generally parallel to rectilinear lower glass edge 12. Opening 70 extends generally parallel to channel 72 as well as to the edge of glass 12 as shown. In order to enhance adherence of attachment member 52 to glass 12, at least one of the securing flanges, in this case flange 58, has a thickness which is increased with respect to the thickness of the other securing flange 56 in order to provide increased curing heat for the primer applied under the molding material thereby enhancing overall adhesion strength for the gasket to glass after molding.

As shown in FIGS. 7 and 9, the fourth embodiment 80 of the window panel assembly incorporating modified attachment members 82, 84 is illustrated. As in embodiment 10, attachment members 82, 84 are spaced apart along the lower edge of sheet 12 and are each adapted to receive one of the rollers from the window regulator mechanism. Each attachment member 82, 84 includes an attachment flange 86 projecting outwardly away from the peripheral edge of sheet 12 and a pair of molded, securing flanges 88, 90 which extend over the side surfaces of glass sheet adjacent its edge toward the center of the sheet to envelope and encapsulate the peripheral edge in the location of the attachment member. Securing flanges 88, 90 may be increased in thickness to enhance the curing heat for the molding material to enhance adhesion strength. Each of the attachment flanges 86 includes an elongated opening 92 extending entirely through the flange for receipt of and access by a roller mechanism from a window regulator from either side thereof. Opening 92 is elongated in the lengthwise direction, is rectilinear, and generally extends parallel to the edge of glass 12. At either end of each elongated opening 92 are enlarged, circular areas 94 which allow the retaining F flanges adjacent either side of the roller R in window regulator mechanism M to be pushed through the openings followed by rolling the roller along the length of opening 92 into position Such insertion of the roller mechanism after assembly avoids the necessity of having to assemble the roller in the slot or opening 92 and saves considerable installation time. As with attachment members 14, 16, members 82, 84 are each preferably molded from RIM polyurethane material and form connecting cavities extending to connecting portions 18a, 20a and gasket portions 18, 20 as described above. The typical extremes of the paths of travel of the rollers in window regulator mechanism M are shown in phantom in FIG. 7 for this embodiment.

With reference to FIG. 8, an additional embodiment 100 of the window panel assembly is shown including a one-piece attachment member 102 having a cross section substantially similar to that of either attachment member 82 or 84 as shown in FIG. 9. As with attachment members 82, 84, member 102 includes an attachment flange 104 in which is formed an elongated slot or opening 106 extending entirely through flange 104. Member 102 is secured to the lower edge of glass sheet 12 by means of securing flanges 108, 110 which are substantially similar to flanges 88, 90 and may have an increased thickness to enhance adhesion strength as described above. Each of the closed ends of opening 106 includes an enlarged circular area 112 similar to area 94 to allow insertion of the roller assembly R without prior disassembly as described above.

Because of the overall length of opening 106 in attachment member 102, and to safeguard against deflection of the lower surface of opening 106 when engaged by either of the roller assemblies from the window regulator mechanism, an integrally molded support or connector 114 may optionally be formed extending across the opening 106 generally perpendicular to the extent of the opening to connect the upper and lower areas of the attachment flange 104. Inclusion of support 114 depends on the length of opening 106 and the resiliency of the molding material from which attachment member 102 is formed. As described above, the normal range of motion for either roller in window regulator assembly M is generally toward either closed end of opening 106 as shown in phantom in FIG. 8. Hence, support connector 114 is formed generally in the center of opening 106 intermediate the closed ends thereof in a position which does not interfere with the range of travel of the rollers in mechanism M. As above, attachment member 102 may be molded from RIM polyurethane or other polymeric materials and is formed by cavity which leads to connecting portions 18a, 20a and gaskets 18, 20 in the manner described above.

Two additional embodiments of the window panel assembly including attachment members similar to members 82, 84 and 102 are shown in FIGS. 10–13 but including attachment flanges which are offset from the general plane of the glass sheet 12. In embodiment 120, shown in FIGS. 10 and 11, a pair of spaced attachment members 122, 124 are molded directly on the lower edge of sheet glass 12. Each attachment member includes an attachment flange 126 including an elongated opening 128 having enlarged circular ends 130 as well as a pair of securing flanges 132, 134 on opposite sides of the glass sheet periphery. At least one of the securing flanges such as flange 134 includes an elongated area 136 of increased thickness to increase adhesion strength as described above As shown in FIG. 11, attachment flange 126 is offset from the plane of sheet 12 toward securing flange 132 in order to provide better positioning for receipt of roller R of window regulator mechanism M. As with embodiments 80 and 100, enlarged openings 130 are adapted to receive roller assembly R without disassembly prior to movement of the roller into opening 128 thereby decreasing assembly time.

A one-piece version of embodiment 120 is shown at 140 in FIGS. 12 and 13. In this embodiment, a one-piece attachment member 142 is molded directly on the lower edge of glass sheet 12 as with embodiments 14A, 50 and 100. As with embodiment 120, attachment member 142 includes an attachment flange 144 which is offset from the general plane of sheet 12 as shown in FIG. 13. Flange 144 includes an elongated opening 146 having enlarged circular ends 148 for receipt of roller mechanisms without disassembly and a pair of inwardly extending securing flanges 150, 152. At least one of the securing flanges, in this case flange 150, includes an elongated area 154 having an increased thickness to enhance adhesion strength. As in embodiment 100, a connecting support 156 may be included in the center of opening 146 to connect the upper and lower portions of attachment flange 144 for additional support depending on the overall length of the opening 146 and the stiffness and resiliency of the molding material from which attachment member 142 is formed to support the roller mechanisms. As above, support 156 does not interfere with the normal range of travel of the rollers in opening 146 which is shown by the positions of the rollers in phantom at either end of the opening in FIG. 12.

As shown in FIG. 13, one form of a roller assembly 160 on a regulator mechanism is shown and is especially useful with the elongated openings 92, 106, 128 and 146 of embodiments 80, 100, 120 and 140. Roller assembly 160 includes a cylindrical support 162 formed integrally with an enlarged head 164 on one end and a planar, circular washer or flange 166 on the opposite end. Head 164 and flange 166 confine a polymeric plastic bushing 168 which is rotatably fitted around the cylindrical, circumferential surface of support 162 for engagement with the lower surface of opening 146 in attachment member 142. Support 162 is threadedly secured to a support/mounting bar 170 by means of a headed securing bolt 172. In the present invention, roller assembly 160 may be assembled prior to insertion in elongated opening 146 followed by bushing the conically shaped head 164 through one or the other of openings 148 at either end of opening 146 until bushing 16 is aligned with the top and bottom surfaces of opening 146 and thereafter moved into the main portion of opening 146 intermediate openings 148.

In each of the embodiments of the molded attachment members, the openings for receiving the window regulator mechanisms have been described as being substantially rectilinear. However, it is within the scope of the present invention to form the channel portions or the openings in any of the embodiments in a curved form to change the rate or the direction of motion of the window assembly as it is being raised and lowered. In addition, the shape of the channels or openings can be changed to accommodate desired rollers or other mechanisms by adjusting the shape and dimension of the mold cavities. Also, for embodiments 10, 80 and 120, it would be possible to combine different attachment members on one window assembly, such as members 14 and 84 or 124. Also, for members 14, 16, the openings 42 can face in opposite direction if desired.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A panel assembly for vehicles comprising:
   a sheet of material having side surfaces and a peripheral edge;
   at least one attachment member for connecting said sheet to a support such as a window regulator mechanism, said attachment member being molded on said peripheral edge of said sheet from a moldable, resinous material such that said member is securely adhered to said sheet during molding, said attachment member having securing flanges extending along both side surfaces of said sheet and encapsulating said peripheral edge, and an elongated slot extending along the length of said member for receiving a portion of the window regulator mechanism; and access means for inserting a portion of the window regulator mechanism in said slot;
   whereby a portion of the regulator mechanism may be supported on said attachment member for movement in said slot to move said panel assembly between desired positions.

2. The panel assembly of claim 1 wherein said attachment member also includes an elongated, generally C-shaped channel portion including a channel interior; said slot including an elongated opening on one side of said channel portion, which opening communicates with said channel interior for receiving a portion of the window regulator mechanism.

3. The panel assembly of claim 2 including a roller assembly on a window regulator mechanism, said roller assembly being mounted in said elongated opening and including a rotatable roller mounted on a support which extends through said opening, said support being secured on a mounting member on said regulator mechanism with said roller engaging the bottom surface of said opening.

4. The panel assembly of claim 2 wherein said channel portion includes top, bottom and opposing side walls defining said channel interior; said elongated opening extending along one of said side walls; said access means including an opening into at least one end of said channel interior.

5. The panel assembly of claim 4 wherein said channel interior is also elongated in a direction perpendicular to said direction of elongation of said generally C-shaped channel portion.

6. The panel assembly of claim 5 said channel transparent sheet includes a rectilinear lower edge; said attachment member being molded on said lower sheet edge; said channel interior being rectilinear and said elongated opening extending generally parallel to said lower sheet edge.

7. The panel assembly of claim 6 wherein said one side wall includes a pair of retaining flanges extending toward one another along said opening; one retaining flange extending downwardly from said top wall; and the other retaining flange extending upwardly from said bottom wall.

8. The panel assembly of claim 7 wherein said channel portion is positioned adjacent one side surface of said sheet such that said channel overlaps said peripheral sheet edge, said top wall being positioned toward the center of said sheet from said peripheral edge and said bottom wall positioned outside said peripheral edge; the other of said side walls lying intermediate said channel interior and said one side surface of said sheet.

9. The panel assembly of claim 8 wherein said sheet is transparent glass; said securing flange on the other of said sheet side surfaces includes an elongated area having an increased thickness, said elongated, increased thickness area providing enhanced adherence of said molded attachment member to said glass sheet.

10. The panel assembly of claim 4 wherein said channel portion is positioned adjacent one side surface of said sheet such that said channel overlaps said peripheral sheet edge, said top wall being positioned toward the center of said sheet from said peripheral edge and said bottom wall positioned outside said peripheral edge; the other of said side walls lying intermediate said channel interior and said one side surface of said sheet.

11. The panel assembly of claim 2 wherein at least one of said securing flanges includes an elongated area having an increased thickness, said elongated, increased thickness area providing enhanced adherence of said molded attachment member to said glass sheet.

12. The panel assembly of claim 2 wherein said C-shaped channel portion is offset from the general plane of said sheet.

13. The panel assembly of claim 2 wherein said C-shaped channel portion is generally aligned with said peripheral edge of said sheet.

14. The panel assembly of claim 2 including a pair of said attachment members spaced from one another along said peripheral sheet edge; each of said attachment members including a generally C-shaped channel portion with an elongated opening extending along one side and forming said slot; each of said slots opening toward the same side of said assembly; each of said channel portions adapted to receive a different portion of a window regulator mechanism.

15. The panel assembly of claim 14 wherein each of said attachment members also includes said molded securing flanges extending inwardly toward the center of said sheet along said side surfaces from said peripheral edge and encapsulating said peripheral sheet edge and said access means; at least one of said securing flanges on each attachment member including an elongated area having an increased thickness, said elongated, increased thickness areas providing enhanced adherence of said molded attachment members to said sheet.

16. The panel assembly of claim 14 wherein each of said channel portions includes top, bottom and opposing side walls defining a channel interior; said elongated opening extending along one of said side walls; said access means including an opening into at least one end of said channel interior.

17. The panel assembly of claim 16 wherein each of said channel interiors is also elongated in a direction perpendicular to said direction of elongation of said generally C-shaped channel portions.

18. The panel assembly of claim 16 wherein said sheet is transparent and includes a rectilinear lower edge; said attachment members being molded on said lower sheet edge; each of said channel interiors being rectilinear with said elongated openings extending generally parallel to said lower sheet edge.

19. The panel assembly of claim 14 wherein each of said C-shaped channel portions is offset from the general plane of said sheet.

20. The panel assembly of claim 14 wherein each of said C-shaped channel portions is generally aligned with said peripheral edge of said sheet.

21. The panel assembly of claim 1 wherein said attachment member includes an attachment flange extending outwardly of said peripheral sheet edge; said slot and access means including an elongated opening having closed ends and extending entirely through said attachment flange enabling access thereto from either side of said assembly; said opening adapted to receive a portion of the window regulator mechanism.

22. The panel assembly of claim 21 wherein said access means also include an enlarged area at least one of said closed ends of said elongated opening, said enlarged area adapted to receive a roller from a window regulator mechanism prior to insertion into said elongated opening.

23. The panel assembly of claim 22 wherein said sheet includes a rectilinear lower edge; said elongated opening being rectilinear and extending generally parallel to said lower sheet edge.

24. The panel assembly of claim 21 including a molded support extending across said elongated opening intermediate said closed ends thereof.

25. The panel assembly of claim 21 wherein at least one of said securing flanges includes an elongated area having an increased thickness, said elongated, increased thickness area providing enhanced adherence of said molded attachment member to said glass sheet.

26. The panel assembly of claim 25 wherein said attachment flange is offset from the general plane of said sheet.

27. The panel assembly of claim 21 wherein said attachment flange is generally aligned with said peripheral edge of said sheet.

28. The panel assembly of claim 21 wherein said attachment flange is offset from the general plane of said sheet.

29. The panel assembly of claim 21 including a pair of said attachment members spaced from one another along said peripheral sheet edge; each of said attachment members including an attachment flange extending outwardly of said peripheral sheet edge; said slot and access means in each attachment flange including an elongated opening having closed ends and extending entirely through said attachment flange enabling access thereto from either side of said assembly; each of said openings adapted to receive a different portion of the window regulator mechanism.

30. The panel assembly of claim 29 wherein said access means also include an enlarged area at least one of said closed ends of each of said elongated openings, said enlarged areas adapted to each receive a roller from a window regulator mechanism prior to insertion into said elongated opening.

31. The panel assembly of claim 29 wherein at least one of said securing flanges in each of said attachment members includes an elongated area having an increased thickness, said elongated, increased thickness areas providing enhanced adherence of said molded attachment members to said sheet.

32. The panel assembly of claim 29 wherein each of said attachment flanges is offset from the general plane of said sheet.

33. The panel assembly of claim 29 wherein each of said attachment flanges is generally aligned with said peripheral edge of said sheet.

34. The panel assembly of claim 1 including at least one gasket molded on another portion of said peripheral sheet edge and joined to said attachment member.

35. The panel assembly of claim 34 wherein said attachment member and gasket are molded from reaction injection molded polyurethane, said sheet being glass and including an adhesion enhancing primer coating on said side surfaces and peripheral edge of said sheet at the positions of said gasket and attachment member prior to molding.

36. The panel assembly of claim 34 wherein said attachment member and gasket are molded from reaction injection molded polyurethane, said sheet being glass and including an adhesion enhancing primer coating on said side surfaces and peripheral edge of said sheet at the positions of said gasket and attachment member prior to molding.

37. A window assembly for vehicles comprising:
a sheet of transparent material having side surfaces and a peripheral edge;
at least one attachment member for connecting said sheet to a support such as a window regulator mechanism, said attachment member being molded on said peripheral edge of said sheet from a moldable, resinous material such that said member is securely adhered to said sheet during molding, said attachment member having an elongated, generally C-shaped channel portion therein, said channel portion having a top, bottom and side walls, at lest one side wall having an elongated opening therein into a channel interior adapted to receive a roller from the window regulator mechanism, and an opening into said channel interior at least one end of said channel portion;
whereby a roller from a window regulator mechanism may be supported for rolling movement within said molded channel for moving said window assembly between desired positions.

38. The window of claim 37 wherein said top, bottom and opposing side walls of said channel portion define said interior channel; said elongated opening extending along one of said side walls.

39. The window assembly of claim 38 wherein said one side wall includes a pair of retaining flanges extending toward one another along said opening; one retaining flange extending downwardly from said top wall; and the other retaining flange extending upwardly from said bottom wall.

40. The window assembly of claim 39 wherein said attachment member also includes molded securing flanges extending inwardly toward the center of said sheet along said side surfaces from said peripheral edge and encapsulating said peripheral sheet edge; at least one of said securing flanges including an elongated area having an increased thickness, said elongated, increased thickness area providing enhanced adherence of said molded attachment member to said sheet.

41. The window assembly of claim 40 wherein said channel portion is positioned adjacent one side surface of said sheet such that said channel overlaps said peripheral sheet edge, said top wall being positioned toward the center of said sheet from said peripheral edge and said bottom wall positioned outside said peripheral edge; the other of said side walls lying intermediate said channel interior and said one side surface of said sheet.

42. The window assembly of claim 40 wherein said C-shaped channel portion is generally aligned with said peripheral edge of said sheet.

43. The window assembly of claim 37 including a pair of said attachment members spaced from one another along said peripheral sheet edge; each of said attachment members including a generally C-shaped channel portion with an elongated opening along one side forming said slot; each of said slots opening toward the same side of said assembly; each of said channel portions adapted to receive a different portion of a window regulator mechanism.

44. The window assembly of claim 37 including at least one gasket molded on another portion of said peripheral sheet edge and joined to said attachment member.

45. A window assembly for vehicles comprising:
a sheet of transparent material having side surfaces and a peripheral edge;
at last one attachment member for connecting said sheet to a support such as a window regulator mechanism, said attachment member being molded on said peripheral edge of said sheet from a moldable, resinous material such that said member is securely adhered to said sheet during molding, said attachment member including an attachment flange extending outwardly of said peripheral sheet edge and an elongated opening having closed ends and extending entirely through said attachment flange enabling access thereto from either side of said assembly; said opening adapted to receive a roller from the window regulator mechanism for rolling movement within said opening for moving said window assembly between desired positions.

46. The window assembly of claim 45 wherein at least one of said closed ends of said elongated opening includes an enlarged area adapted to receive the roller from the window regulator mechanism prior to insertion into said elongated opening.

47. The window assembly of claim 45 wherein said attachment member also includes molded securing flanges extending inwardly toward the center of said sheet along said side surfaces from said peripheral edge and encapsulating said peripheral sheet edge; at least one of said securing flanges including an elongated area having an increased thickness, said elongated, increased thickness area providing enhanced adherence of said molded attachment member to said sheet.

48. The window assembly of claim 47 wherein said attachment flange is offset from the general plane of said sheet.

49. The window assembly of claim 45 wherein said attachment flange is generally aligned with said peripheral edge of said sheet.

50. The window assembly of claim 45 including a molded support extending across said elongated opening intermediate said closed ends thereof.

51. The window assembly of claim 45 including a pair of said attachment members spaced from one another along said peripheral sheet edge; each of said attachment members including an attachment flange extending outwardly of said peripheral sheet edge; said slot in each attachment flange including an elongated opening having closed ends and extending entirely through said attachment flange enabling access thereto from either side of said assembly; each of said openings adapted to receive a different portion of the window regulator mechanism.

52. The window assembly of claim 45 including at least one gasket molded on another portion of said peripheral sheet edge and joined to said attachment member.

53. The panel assembly of claim 52 wherein said attachment member and gasket are molded from reaction injection molded polyurethane, said sheet being glass and including an adhesion enhancing primer coating on said side surfaces and peripheral edge of said sheet at the positions of said gasket and attachment member prior to molding.

* * * * *

UNITED STATES PATENT AND TRADEMARK OFFICE
CERTIFICATE OF CORRECTION

PATENT NO. : 5,065,545
DATED : November 19, 1991
INVENTOR(S) : Edmund J. Kane et al.

It is certified that error appears in the above-identified patent and that said Letters Patent is hereby corrected as shown below:

Column 3, line 57:

After "assembly" insert --of the--

Column 5, line 9:

"position 20a" should be --portion 20a--

Column 7, line 36:

After "respectively" insert --.--

Column 7, line 63:

After "walls" insert --.--

Column 8, line 36:

After "position" insert --.--

Column 9, line 15:

After "by" insert --a--

Column 9, line 32:

After "above" insert --.--

UNITED STATES PATENT AND TRADEMARK OFFICE
CERTIFICATE OF CORRECTION

PATENT NO. : 5,065,545
DATED : November 19, 1991
INVENTOR(S) : Edmund J. Kane et al.

It is certified that error appears in the above-identified patent and that said Letters Patent is hereby corrected as shown below:

Column 10, line 13:

"bushing 16" should be --bushing 168--

Column 11, claim 6, line 21:

"said channel" should be --wherein said--

Column 13, claim 30, line 19:

"at least" should be --at at least--

Column 13, claim 37, line 65:

After "having" delete --a--

Column 13, claim 37, line 65:

"lest" should be --least--

UNITED STATES PATENT AND TRADEMARK OFFICE
CERTIFICATE OF CORRECTION

PATENT NO. : 5,065,545
DATED : November 19, 1991
INVENTOR(S) : Edmund J. Kane et al It is certified that error appears in the above-identified patent and that said Letters Patent is hereby corrected as shown below:

Column 14, line 1, claim 37:

"at least" should be --at at least--

Column 14, claim 45, line 54:

"at last" should be --at least--

Signed and Sealed this

First Day of June, 1993

Attest:

MICHAEL K. KIRK

*Attesting Officer*     Acting Commissioner of Patents and Trademarks